(12) United States Patent
Schwarz

(10) Patent No.: US 6,240,907 B1
(45) Date of Patent: Jun. 5, 2001

(54) VALVE WITH A VARIABLE VALVE CROSS SECTION

(75) Inventor: Volker Schwarz, Weinstadt (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/507,003

(22) Filed: Feb. 22, 2000

(30) Foreign Application Priority Data

Feb. 25, 1999 (DE) ............................................. 199 08 102

(51) Int. Cl.⁷ .................................................... F02M 37/04
(52) U.S. Cl. ........................................... 123/506; 123/514
(58) Field of Search ................................... 123/458, 514, 123/510–11, 446, 506; 251/129.07, 129.09, 129.1

(56) References Cited

U.S. PATENT DOCUMENTS

| | | | | |
|---|---|---|---|---|
| 6,045,120 | * | 4/2000 | Tarr et al. ........................... | 123/506 |
| 6,062,194 | * | 5/2000 | Schwartz .............................. | 123/506 |
| 6,125,822 | * | 10/2000 | Janik et al. ........................... | 123/506 |

FOREIGN PATENT DOCUMENTS

| | | |
|---|---|---|
| 3700356 | 7/1988 | (DE). |
| 4235508 | 3/1994 | (DE). |
| 4334802 | 1/1995 | (DE). |

* cited by examiner

Primary Examiner—Thomas N. Moulis
(74) Attorney, Agent, or Firm—Lawrence J. Shurupoff

(57) ABSTRACT

A control valve for the fuel return in an injection line in internal combustion engines, which has a valve tappet which is arranged in a longitudinally displaceable manner and which exposes larger valve cross sections as the opening stroke increases and can be actuated against the restoring force of a valve spring by an electric magnet coil. The opening stroke and hence the valve cross section can be adjusted by a spring assembly having at least two actuating springs which can be deflected in the axial direction of the valve tappet and are arranged in parallel and in such a way that they can be subjected to force in an axially offset manner with the result that different resultant spring forces counteract the actuating movement in successive sections of the spring travel.

To allow accurate setting of the valve position, especially in the intermediate positions, the invention makes provision for the actuating travel of the valve tappet to be limited by an axially displaceable stop which is in operative connection with a second actuating drive, independent of the magnet coil, and, in a direction opposed to the actuating drive with the spring assembly.

11 Claims, 3 Drawing Sheets

120
VALVE WITH A VARIABLE VALVE CROSS SECTION

BACKGROUND OF THE INVENTION

1. Field of the Invention

The invention relates to a valve, in particular a control valve in a fuel line of an injection system for internal combustion engines.

2. Description of Prior Developments

DE 4334802 C1 has disclosed a control valve which is arranged between an injection pump and a valve that opens under high pressure, in the injection line in fuel injection systems for diesel engines. In this arrangement, the known control valve controls the valve cross section of a return branching off from the injection line. The control valve has a valve tappet which is arranged in a longitudinally displaceable manner and which exposes larger valve cross sections of the return as the opening stroke increases and can be actuated against the restoring force of a valve spring by an electric magnet coil. With the magnet coil deenergized, the valve spring holds the valve in the open position, with the result that the fuel supplied flows off via the return. If the valve tappet closes the return owing to the magnetic force of the coil, the pressure required to trigger the injection process is built up rapidly in the injection line. The injection valve at the end of the injection line opens when the rated pressure is reached and allows access to the combustion chamber.

To allow precise metering of extremely small injection quantities at high engine speeds, the valve cross section should be adjustable. One known solution of this problem is to provide a spring assembly having at least two actuating springs which can be deflected in the axial direction of the valve tappet and which are arranged in parallel and in a manner which allows them to be subjected to a force in an axially offset manner by the valve tappet. If voltage is applied to the magnet coil, the valve reduces the cross section of the return against the force of the first spring in a first stroke range. If the voltage at the magnet coil is increased until the valve has passed through the first stroke range in the closed position, the valve tappet comes into engagement with the second spring, which counteracts the closing movement of the valve in a second stroke range in addition to the first spring. If the voltage is increased further, the valve comes to rest against the valve seat after passing through both stroke ranges counter to the resultant restoring force of both springs, with the result that the return is closed. Owing to possible fluctuations in the drive voltage of the coil and the resulting interaction between the valve tappet, which is moved in free oscillation, and the spring forces, it is not possible to set accurate positions of the closing member nor to set precise valve cross sections.

DE 3700356 A1 proposes a similar solenoid valve for controlling injection systems, the electromagnet of which has two switchable magnetic forces for three corresponding positions of the valve tappet. In this known control valve too, the valve tappet is assigned two return springs, of which the first spring engages continuously on the valve tappet and the second spring comes into operative engagement during displacement, in the stroke range between the completely open position and the intermediate position.

In the case of the known control valves for the fuel return in the injection line of internal combustion engines, the entire magnet and hence valve stroke must be designed in such a way that the valve cross section exposed is sufficiently large to ensure reliable replenishment of the fuel removed during injection in the time between injection events at all engine speeds. During the relief process at the end of the respective injection, the valve cross section is too large, particularly at low engine speeds, resulting in overrelief of the high-pressure space. It has been found that it is not possible accurately to set the valve cross sections required to avoid overrelief with the valves of the known type, especially in the intermediate positions. This results in instabilities in the injection process envisaged. Indeed, if a fuel injection involving a plurality of partial injection processes during the operating cycle is envisaged, the overrelief due to the cutting off of the pilot injection considerably disrupts or totally prevents the main injection.

SUMMARY OF THE INVENTION

The object on which the present invention is based is to develop the valve of the generic type in such a way that accurate setting of the valve cross section, in particular of the intermediate positions, is possible.

When the magnet coil of the valve tappet is energized, the valve tappet is moved into the position determined by the stop and associated with the corresponding valve cross section. The valve cross section is therefore dependent on the position of the longitudinally displaceable stop, which can be set precisely in the required position by means of a separate actuating drive. In contrast to the valve tappet, which is actuated at least once in each operating cycle, the stop can remain in the same position over a prolonged period of operation of the internal combustion engine, namely until changed operating conditions, e.g. a change in engine speed, require a change in the valve cross section during injection and hence a displacement of the stop.

In accordance with the number of actuating springs in the spring assembly which act on the stop, a corresponding number of valve positions can be set, it being possible, as regards the actuating force required to overcome the restoring forces of the spring assembly which are assigned to the respective valve positions, for the actuating drive to be adjustable in stages. It is expedient if the actuating drive of the stop is controlled as a function of the speed of the internal combustion engine and the stop is moved into a predetermined position in which a valve cross section assigned to the engine-speed range occupied in each particular case is exposed for relief via the return.

In an advantageous refinement of the invention, the actuating drive of the stop is designed as a second electric magnet coil, the armature of which is connected to an actuating piston which can be displaced with an effect on the spring assembly and carries the stop for the valve tappet of the control valve. To adjust the stop, the actuating magnet coil is subjected to the voltage required to ensure that the magnetic force which arises produces the actuating force corresponding to the desired stop position, this being the actuating force to overcome the associated restoring forces of the spring assembly required. A compact construction of the adjustable stop is obtained if the actuating piston passes through the actuating magnet coil, and its free end forms the stop for the valve tappet. It is expedient if the actuating piston, the actuating magnet coil and the spring assembly are accommodated in a stop housing from which the actuating piston can be extended through an end wall adjacent to the valve tappet. This ensures that the control valve is associated with a compact subassembly including the stop housing, which can be assembled separately.

BRIEF DESCRIPTION OF THE DRAWINGS

Further features of expedient developments of the invention will become apparent from the following description of an illustrative embodiment of the invention with reference to the drawing, in which.

DETAILED DESCRIPTION OF THE PREFERRED EMBODIMENTS

Figure 1:
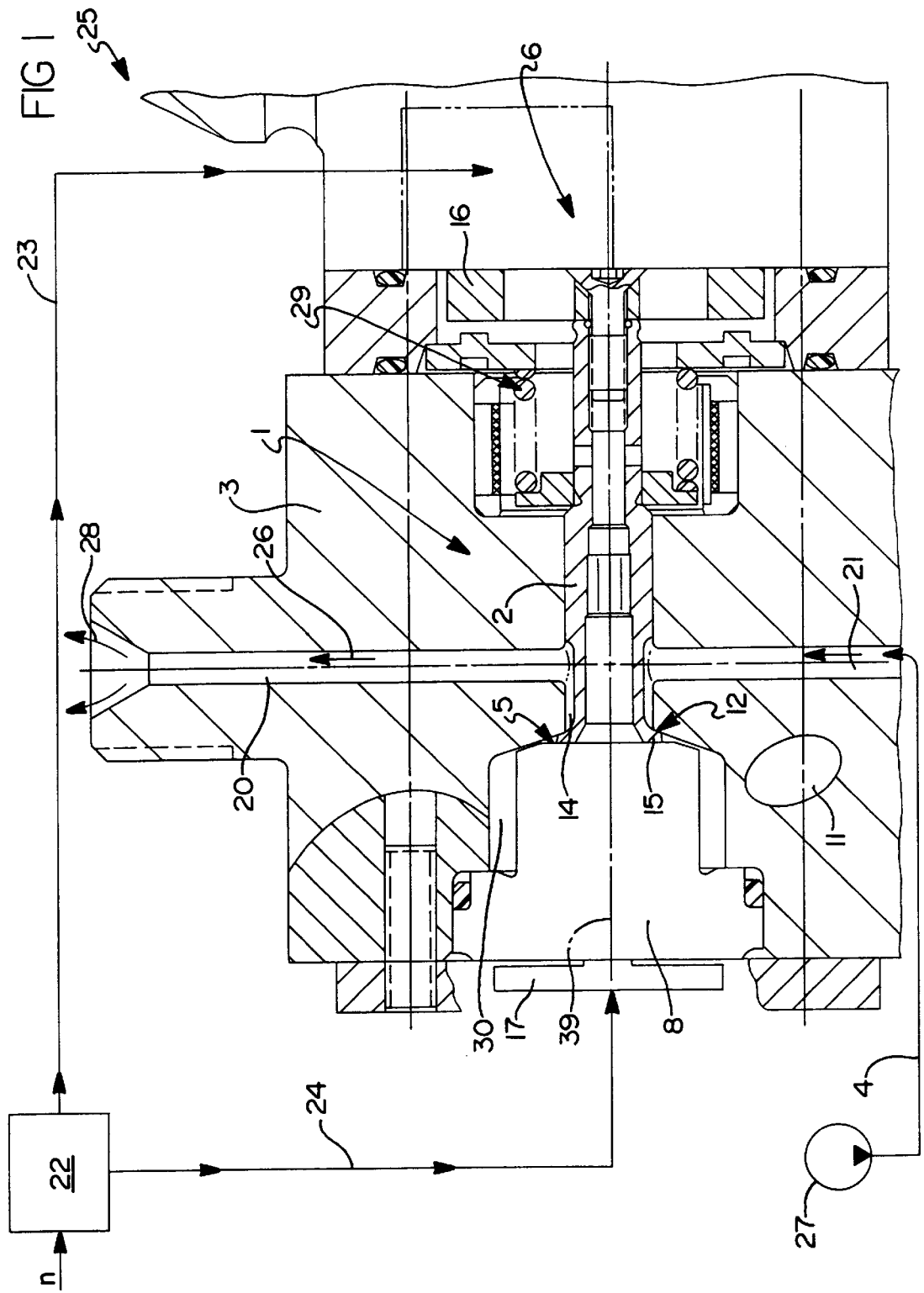
FIG. 1 shows a sectioned view of the control valve of a PLN injection system.

FIG. 1 shows a pump-line-nozzle (PLN) injection system 25 (illustrated in partially schematic form) of an internal combustion engine not shown here. The control valve 1 of the injection system 25 controls a return line 11 of the injection line 4, through which, in the open position, the fuel delivered by the injection pump, expediently a plug-in pump 27, flows back out of the low-pressure part 21 of the injection line into the fuel tank, for example. To trigger an injection process, the control valve 1 closes the return 11, leading to a rapid build-up of the required injection pressure in the high-pressure part 20 of the injection line 4 due to the continued supply of fuel. When the injection pressure is reached, the injection valve (not shown here) of the internal combustion engine opens and the fuel is ejected from the high-pressure part 20 into the respective combustion chamber in the direction of arrow 28. The control valve 1 comprises a valve tappet 2 which is arranged in a longitudinally displaceable manner in a valve casing 3 and, at its free end, has a closing member 15 which interacts with a valve seat 12 and controls the return line 11.

The valve tappet 2 can be actuated counter to the restoring force of a valve spring 29 by an electric magnet coil 6. That end of the valve tappet 2 which is remote from the closing member 15 carries a magnet armature 16 which, when the magnet coil is energized, is attracted due to the magnetic forces which arise, the magnetic force depending on the respectively applied electric voltage. If the magnet coil 6 is unenergized, the valve spring 29 pushes the valve tappet 2 into the open position and the fuel delivered by the plug-in pump 27 is directed into the tank return 11 by the opened control valve 1. To initiate injection, the magnet coil is energized, the valve tappet 2 thereby being moved, overcoming the restoring force of the valve spring 29, with the result that the valve cross section 5 is closed and the return line 11 is interrupted. To end injection, the magnet coil is deenergized again and the valve spring 29 opens the control valve 1. The static pressure in the high-pressure part 20 of the injection line 4 is dissipated rapidly via the opened valve cross section and the tank return.

A control unit 22 monitors the electric circuit 23 of the coil 6 and ensures that the required electrical voltage is applied to the magnet coil 6 to move the valve tappet 2 at the injection instant envisaged. As soon as the valve cross section 5 has been closed by the seating of the valve member 15 on the valve seat 12, static pressure can build up in the high-pressure part 20 of the injection line 4 and ultimately leads to the opening of the injection nozzle and hence to injection, fuel flowing in behind in the direction of arrow 26.

The axial direction 39 of the valve tappet 2 intersects the longitudinal axis of the injection line 4, a recess on the circumference of the tappet 2, the said recess extending longitudinally as far as the valve member 15, forming a valve chamber 14 which connects the low-pressure part 21 to the high-pressure part 20 of the injection line 4. The fluid connection between the two sections of the injection line 4 is maintained during displacement of the valve tappet, and the fact that the recess extends as far as the valve member 15 simultaneously provides the outflow connection between the low-pressure part 21 and the tank return 11 while the injection valve is open.

The opening actuating travel of the valve tappet 2 is limited by a displaceable stop 5. The stop 5 and the components provided for its axial adjustment are accommodated in a stop housing 8 arranged in a return chamber 30 in the valve casing 3. An annular space, from which the tank return line 11 branches off, is formed between the circumference of the stop housing 8 and the inner wall of the return chamber 30. The axial position of the stop 5 determines the exposed valve cross section via which the pressure in the high-pressure part 20 is relieved upon completion of the injection process and opening of the control valve 1. As soon as the magnet coil 6 which acts on the valve tappet 2 is deenergized, therefore, the valve tappet 2 with its closing member 15 comes into defined contact with the stop 5 and is held in the position precisely determined by the stop. The adjustment of the valve cross section 5 is therefore unaffected by previously common innaccuracies due to virtually uncontrollable restoring forces of the valve spring 29 and of the magnetic forces of the magnet coil 6.

The valve tappet 2 can be of simple configuration since it is not, as hitherto, provided for adjusting the position of the valve member and therefore does not need to be capable of being moved into a large number of positions and held there. On the contrary, the tappet of the control valve according to the invention is capable only of being switched between an open and a closed position to bring about the opening movement of the valve tappet 2. In this case, all that needs to be ensured in designing the magnet coil 6 is that the magnetic force developed when the electrical voltage is applied exceeds the restoring force of the valve spring 29 used.

For the adjustment and axial displacement of the stop 5, an actuating drive is arranged in the stop housing 8 and, in the illustrative embodiment 2, this drive is a second magnet coil, of which the associated magnet armature 17 is visible here. The embodiment and operation of the adjustable stop are explained in greater detail below with reference to the following figures of the drawing. The axial adjustment of the stop 5 is performed by the control unit 22, which monitors the electric circuit 24 of the magnet coil of the stop 5 and specifies the electrical voltage provided for setting the corresponding stop position as a function of the speed n of the internal combustion engine. The electric circuit 24 of the second magnet coil acting as the actuating drive for the stop 5 and the electric circuit 23 of the magnet coil 6 acting on the valve tappet 2 are controlled independently of one another.

Figure 2:
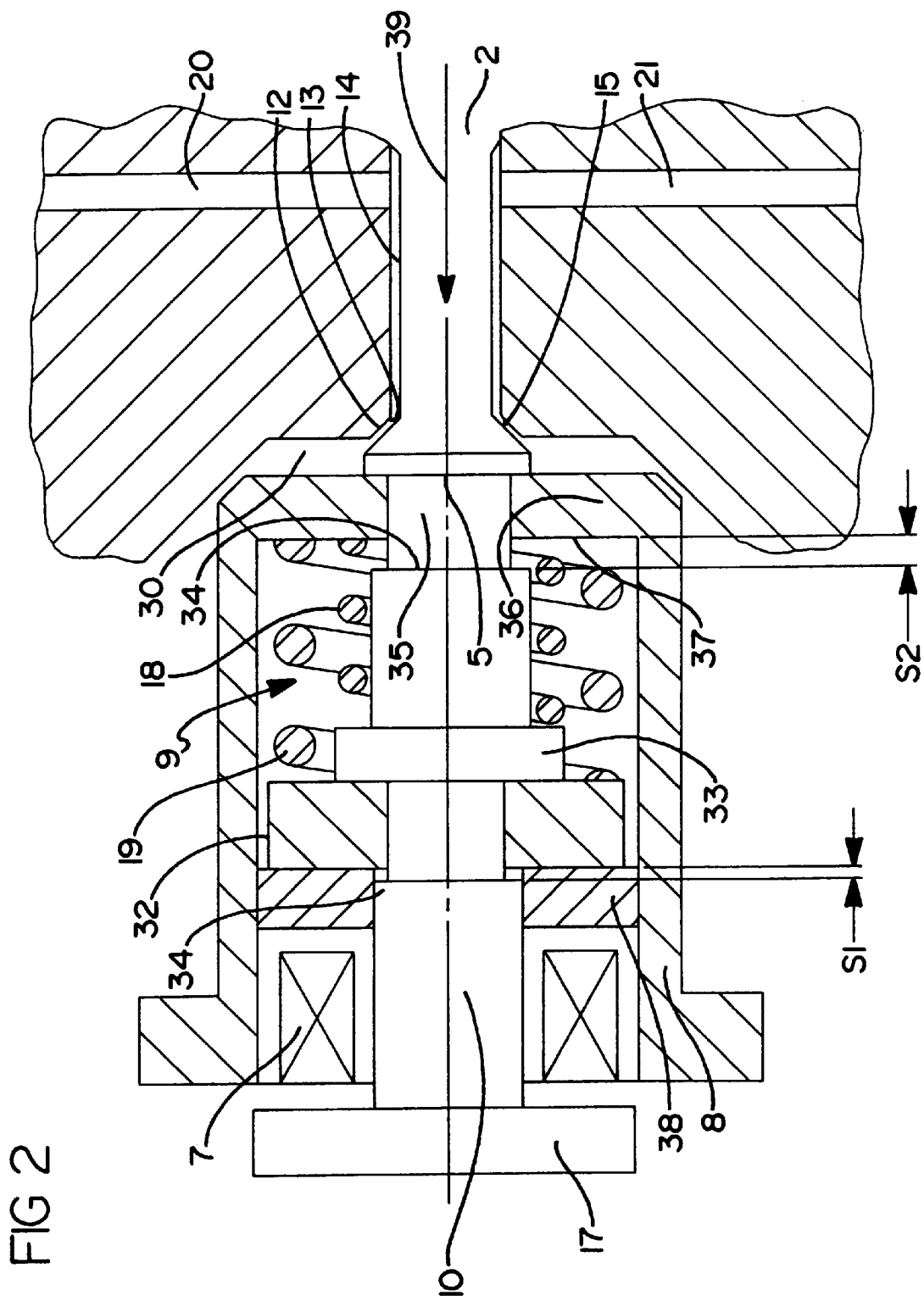
FIG. 2 shows a sectional view of the adjustable stop for the tappet of the control valve.

FIG. 2 shows a sectioned view of the stop housing 8, identical reference numerals to those in FIG. 1 and in the subsequent figures of the drawing being used for identical components.

The stop housing 8 is of cup-shaped and rotationally symmetrical design, the open end of the housing 8 facing away from the valve tappet 2. Arranged in the interior of the stop housing 8 is an actuating piston 10, the free end of which passes through the end 36 of the stop housing 8 and forms the stop 5 for the valve tappet 2. In this arrangement, the actuating piston is guided in a longitudinally displaceable manner in the housing 8 by a radially inward-pointing web 38, being guided at its free spigot end in the end wall 36.

The actuating piston 10 passes through the second magnet coil provided as actuating coil 7 and, at its end situated in the housing opening, is provided with a magnet armature 17. If electrical voltage is applied to the actuating coil 7, the magnetic forces which arise act on the armature 17 and produce an extending force on the actuating piston 10 arranged coaxially with the valve tappet 2. The extension movement of the actuating piston 10 is counteracted by a spring assembly 9, the springs of which are arranged in parallel and in such a way that they can be subjected to force in an axially offset manner in the deflection path of the actuating piston 10.

The actuating springs are expediently designed as helical springs 18, 19 which, in the illustrative embodiment shown, are advantageously designed with different diameters and can be accommodated in a coaxially nested manner in the stop housing 8. In this arrangement, the helical springs are supported at one end on the inside 37 of the end wall 36 of the stop housing 8, the inner helical spring 18 resting against a radial shoulder 33 of the actuating piston 10 and thus counteracting any actuating movement due to the magnetic forces. With the actuating coil 7 deenergized, the inner helical spring 18 pushes the actuating piston 10 into the extreme position, in which the stop 5 allows the greatest actuating travel of the piston 2, thus exposing the maximum possible valve cross section 13 for the return chamber 30.

The maximum extension of the actuating piston 10, which corresponds to the minimum possible valve cross section, is defined by the offset 34 of the spigot 35. As the spigot 35 is extended, the spigot offset 34 comes to rest against the inside 37 of the end wall 36 after travelling the maximum extension distance S2 and stops the extension movement.

The intermediate positions between the extreme positions, namely those involving maximum displacement of the actuating piston 10 attracted by the actuating coil 7, on the one hand, and a deenergized actuating coil on the other hand, i.e. a maximum valve cross section, can be set precisely by the arrangement of a plurality of helical springs in the spring assembly 9. In the illustrative embodiment shown, the spring assembly 9 comprises two helical springs 18 and 19, although it is also possible to provide further springs. Each further spring allows another intermediate position of the stop 5 to be set. Each further actuating spring is assigned a driver ring 32 with a diameter corresponding to the respective spring. The driver ring 32 forms the abutment for the helical spring 19 supported on the housing and is held on the actuating piston 10 in such a way that it can be moved axially section by section. The range of movement of the driver ring 32 corresponds to section S1 of the extension movement of the actuating piston 10, which is to be counteracted solely by the first helical spring 18. Once the actuating piston has travelled the first section S1 of the stroke, a radial offset 31 on the actuating piston 10 comes to rest against the driver ring 32 thereby subjecting the second helical spring 19 to force in addition to the first helical spring 18. If the actuating piston 10 is extended beyond the actuating distance S1, the actuating movement is counteracted by the resultant restoring force of both helical springs 18, 19 arranged in parallel.

Figure 3:
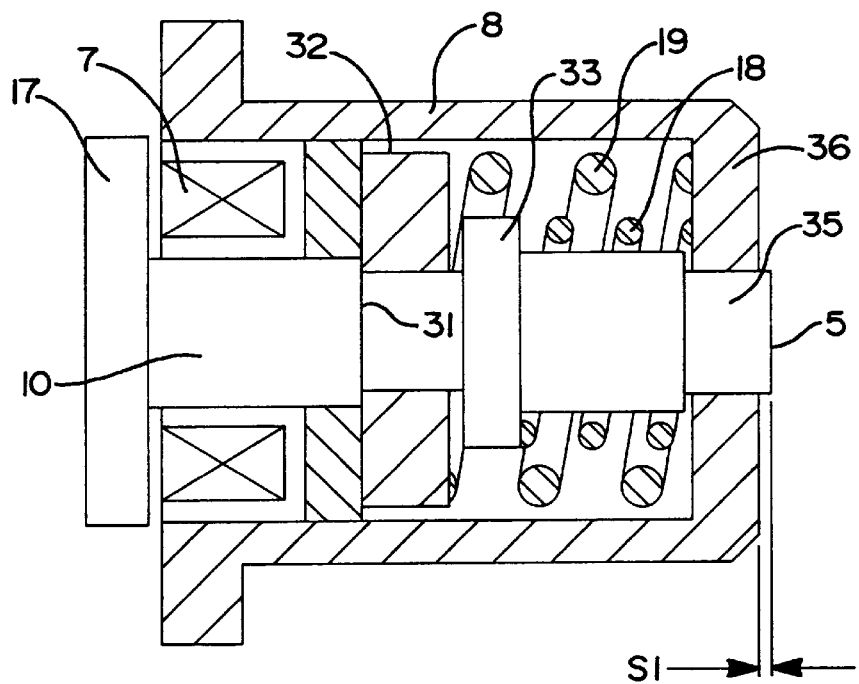
FIG. 3 shows the valve stop illustrated in FIG. 2, in an intermediate position.

FIG. 3 shows the intermediate position with the actuating piston 10 partially extended, the offset 31 coming to rest against the driver ring 32 and, in the case of a further actuating movement, acting upon the latter with an effect on the associated helical spring 19. This position is adopted when the electrical voltage applied to the actuating coil 7 is such that the magnetic force acting to extend the actuating piston 10 exceeds the restoring force of the first, inner, helical spring 18 but not the resultant restoring force of both helical springs, with the result that the actuating piston and, together with it, the stop 5 for the valve tappet are held precisely in the predefined intermediate position.

Figure 4:
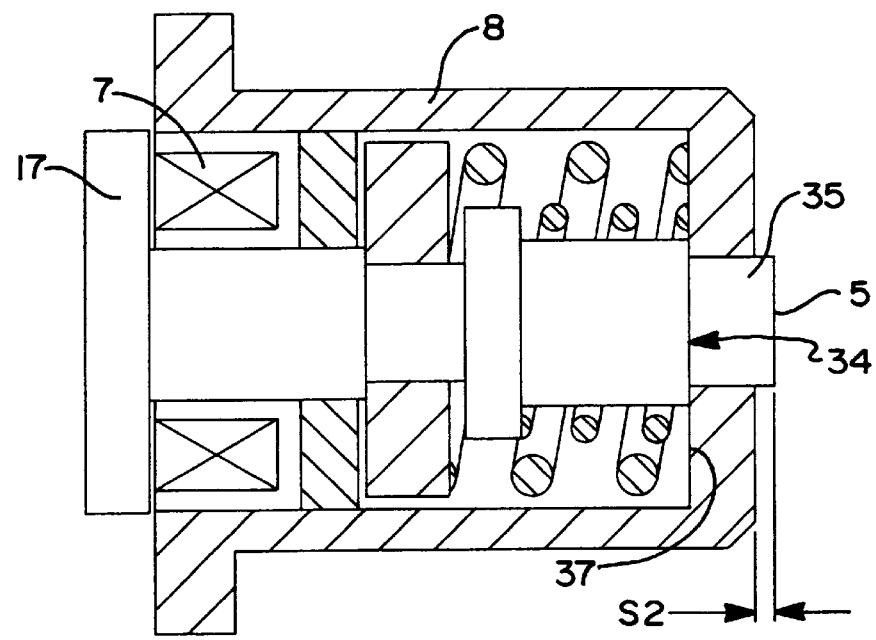
FIG. 4 shows the valve stop illustrated in FIG. 2, in another valve position.

FIG. 4 shows the position of the actuating piston at maximum extension, when the magnetic force of the coil acting on the magnet armature 17 exceeds the resultant restoring force of both helical springs. In this case, the actuating piston 10 is extended out of the stop housing 8 until the radial offset 34 of the spigot 35 comes to rest against the inside 37 of the end wall after the actuating travel S2.

Each position of the stop 5 is assigned a specific electrical voltage which must be applied to the actuating coil 7 for the corresponding axial adjustment of the displaceable stop 5. The electrical voltage corresponding to each position of the valve is specified to the control unit beforehand and is applied to the actuating coil 7 with an effect on the displaceable stop 5 when there is a need to switch the stop over in the case of a change in the speed of the internal combustion engine.

What is claimed is:

1. A control valve for fuel return in an injection line in an internal combustion engine having a valve tappet arranged in a longitudinally displaceable manner and which exposes larger valve cross sections as an opening valve stroke increases and wherein the tappet can be actuated against a restoring force of a valve spring by an electric magnet coil, a spring assembly for the variable setting of the valve cross section, comprising at least two actuating springs which can be deflected in an axial direction of the valve tappet and which are arranged in parallel such that they can be subjected to force in an axially offset manner, and wherein the actuating travel of the valve tappet is limited by an axially displaceable stop which is in operative connection with a second actuating drive and, in a direction opposed to the actuating drive in the axial direction, with the spring assembly.

2. The valve according to claim 1, wherein an actuating force required to overcome restoring forces of the spring assembly associated with the respective valve positions can be adjusted in corresponding stages with the actuating drive assigned to the stop.

3. The valve according to claim 1, wherein the actuating drive of the stop and the magnet coil are controlled independently of one another.

4. The valve according to claim 1, wherein the actuating drive is controlled as a function of the speed of the internal combustion engine.

5. The valve according to claim 1, wherein the actuating drive of the stop is designed as a second electric magnet coil having an armature connected to an actuating piston which can be displaced with an effect on the spring assembly and which carries the stop.

6. The valve according to claim 5, wherein the actuating piston passes through the second magnet coil, and has a free end forming the stop for the valve tappet.

7. The valve according to claim 5, wherein the actuating piston, the second magnet coil and the spring assembly are accommodated in a stop housing from which the actuating piston can be extended through an end wall adjacent to the valve tappet.

8. The valve according to claim 7, wherein the actuating springs of the spring assembly are designed as coxial helical springs of different diameters which are supported against a side of an end wall on the inside of the housing and through which the actuating piston passes.

9. The valve according to claim 8, characterized in that the inner helical spring is supported against a radial shoulder and each further actuating spring is assigned a driver ring which has a diameter corresponding to the respective spring and is held in such a way that it can be moved axially on the actuating piston in an extension range of the stop for the respective spring.

10. The valve according to claim 8, characterized in that the stop is formed on an offset spigot of the actuating piston which is guided by the curved inner surface of the end wall of the stop housing, the offset of the spigot limiting the extension of the stop by coming to rest against the inside of the end wall.

11. The valve according to claim 1, wherein the actuating springs of the spring assembly are preloaded.

\* \* \* \* \*